Nov. 29, 1955

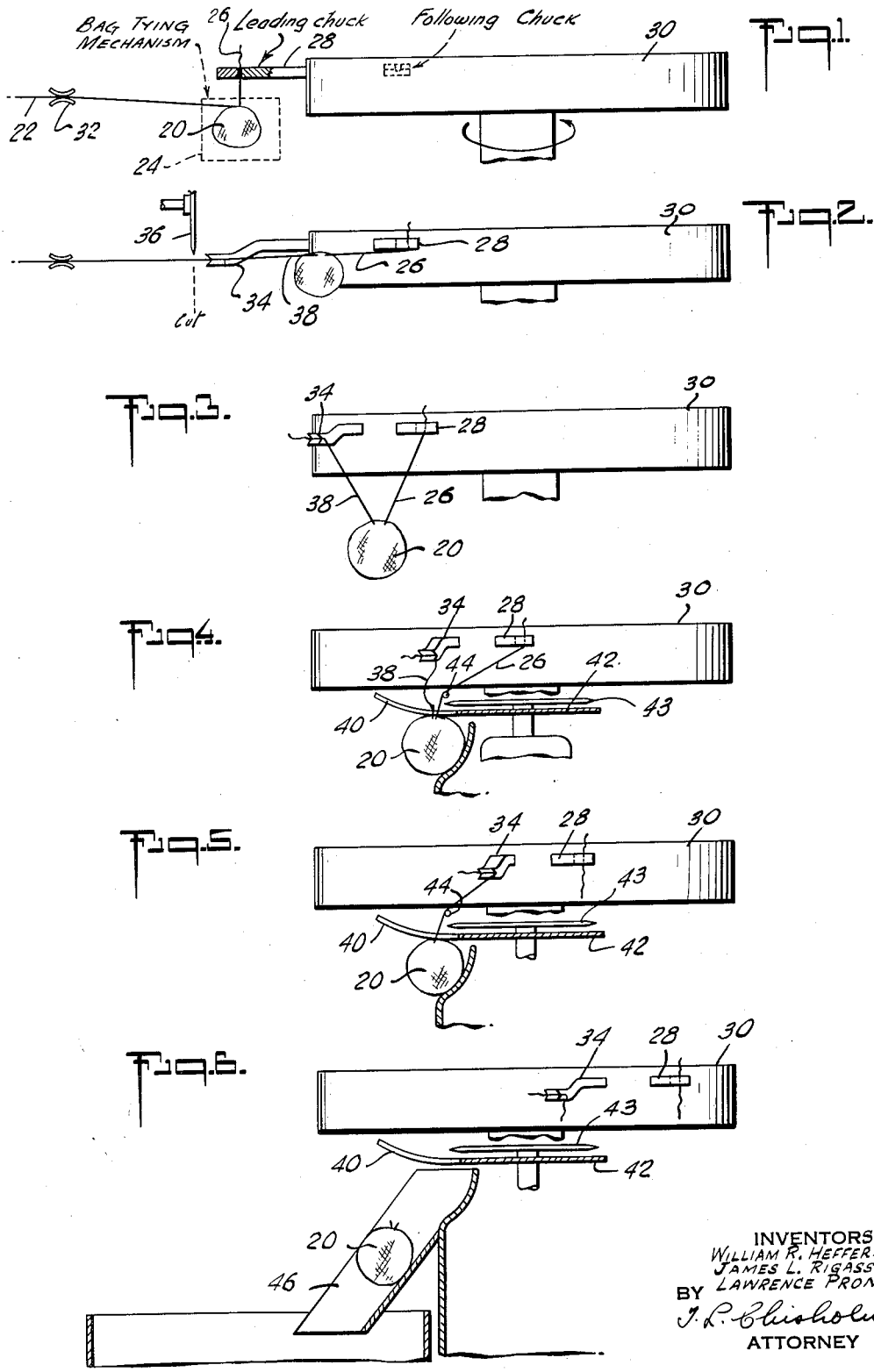

W. R. HEFFERNAN ET AL
APPARATUS FOR SEVERING ENDS OF
STRING TIED ABOUT PACKAGES 2,725,102

Filed Sept. 16, 1950

INVENTORS:
WILLIAM R. HEFFERNAN
JAMES L. RIGASSIO
LAWRENCE PRONIO.
BY J. L. Chisholm
ATTORNEY

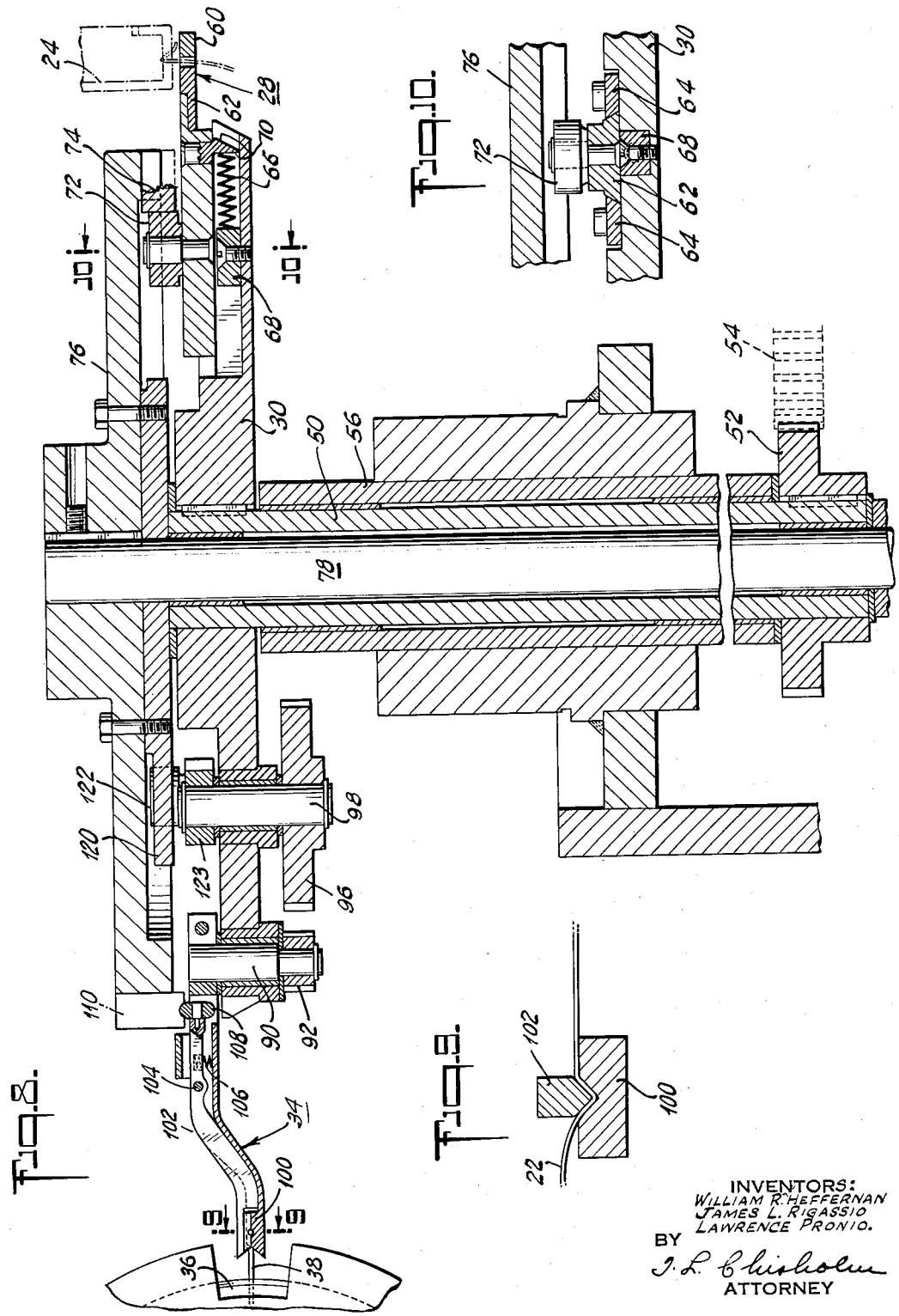

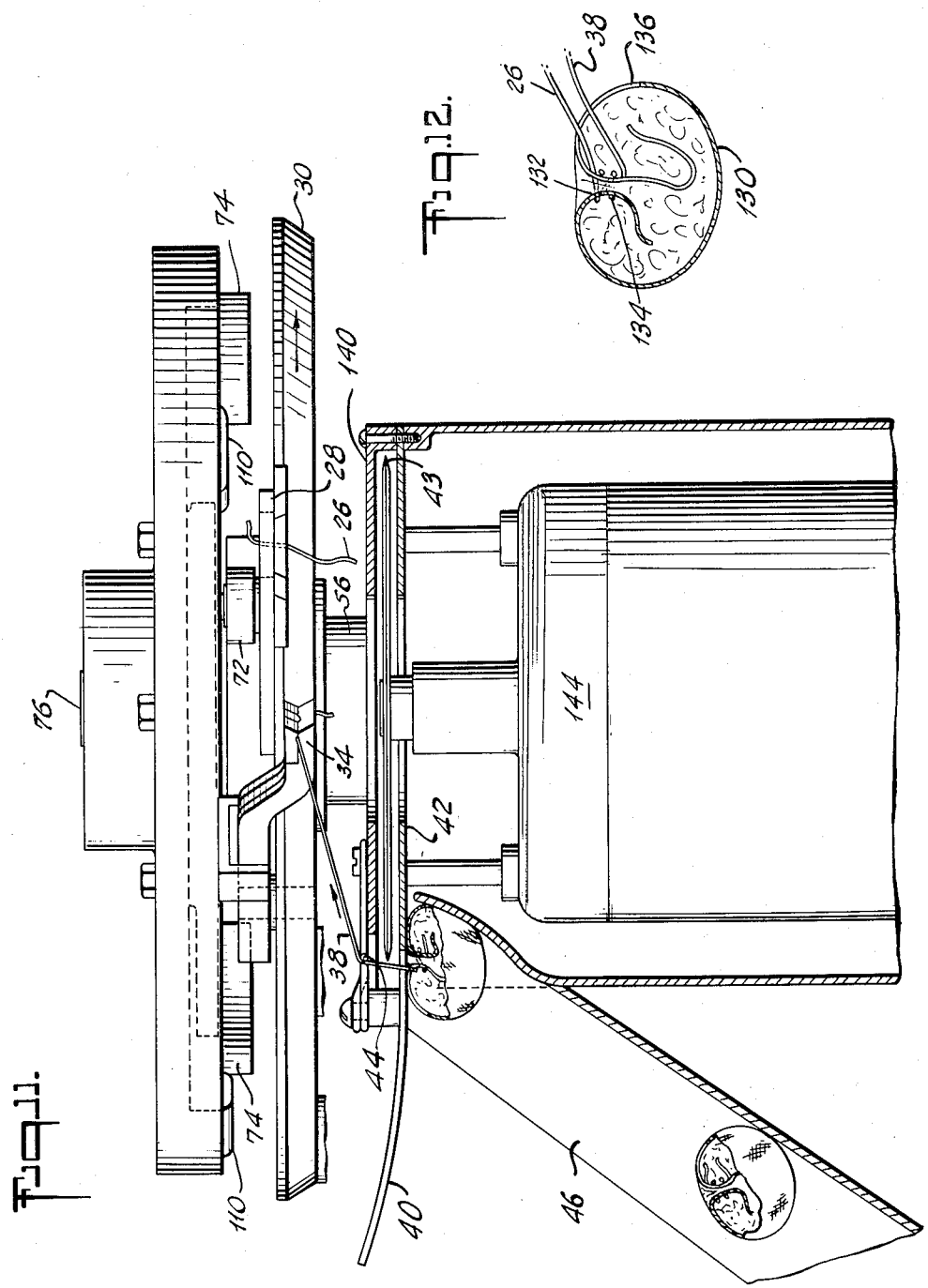

2,725,102
Patented Nov. 29, 1955

2,725,102
APPARATUS FOR SEVERING ENDS OF STRING TIED ABOUT PACKAGES

William R. Heffernan, Metuchen, James L. Rigassio, North Bergen, and Lawrence Pronio, New Brunswick, N. J., assignors to Johnson & Johnson, a corporation of New Jersey Application September 16, 1950, Serial No. 185,242

6 Claims. (Cl. 164—61)

This invention relates to a method and apparatus for severing the ends of strings which have been tied about packages to close them. It includes a novel method and novel means for holding, moving and cutting off strings. It is particularly adapted to cutting off the ends of strings which have been tied around the necks of bags, especially where it is desired to cut off the strings close to the bags, but it is not limited to these applications.

As an example the invention is herein described in connection with cutting strings which are used to tie bags of cotton gauze suitable for surgical sponges. In many such sponges it is desired to have a gauze bag firmly and positively tied with a string and completely free of loose ends, edges or other forms of material which can ravel.

Accordingly it is one of the objects of the invention to provide an effective means for cutting off the ends of string ties close to the bag or package. More particularly it is an object to assure the cutting of each of two string ends independently of one another so that the length of either end remaining on the bag is not influenced by where the other string was cut or the position of the package when it was cut.

In the accompanying drawings:

Figs. 1 through 6 show diagrammatically successive steps in the cutting of a pair of string ends in accordance with one embodiment of our invention;

Fig. 8 is an enlarged vertical section of the apparatus on line 8—8 of Fig. 7;

Fig. 9 is an enlarged section on the line 9—9 of Fig. 8;

Fig. 10 is an enlarged section on the line 10—10 of Fig. 8;

Fig. 11 is an elevation of the apparatus shown in Fig. 7; and

Fig. 12 is a section through one kind of bag upon which the invention is adapted to operate.

The method

Figure 7:
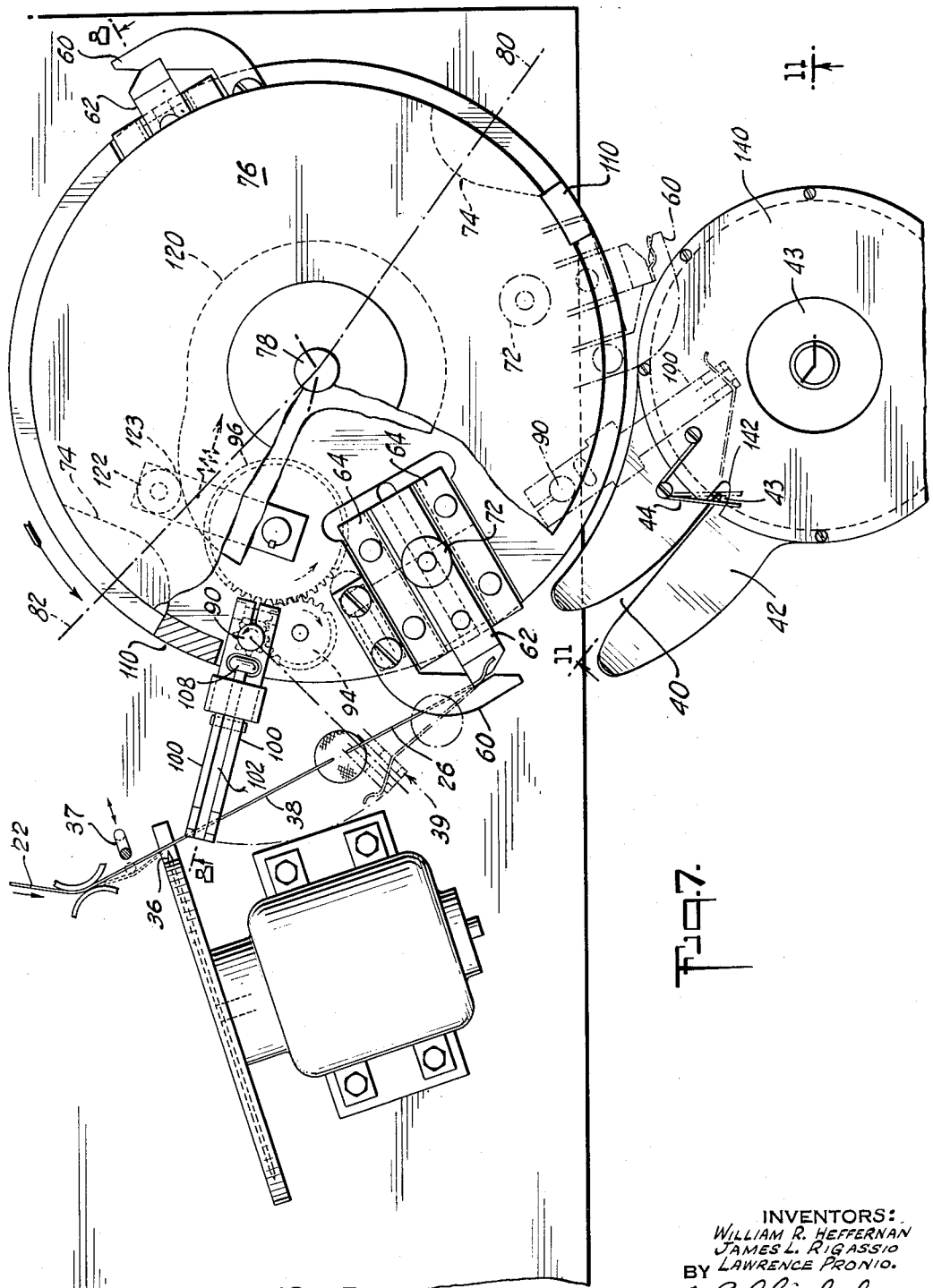
Fig. 7 is a plan view, partly broken away, of one form of apparatus for carrying out the method shown in Figs. 1–6.

The starting material or article upon which the invention operates may be a cloth bag 20 which has been tied with a string 22 leading from any continuous source of supply by and suitable bag-tying mechanism diagrammatically represented by the broken line 24. The free end 26 of the string is grasped by a clamp 28 which is secured to a conveyor, herein exemplified by a rotating head 30. After the end 26 has been grasped by the clamp 28, herein referred to as a leading clamp, the head rotates to pull the string which is yieldingly held by a friction brake 32. Movement of the clamp tightens the string as shown in Fig. 2 and in so doing removes the bag from the bag tying machine. A second clamp 34, called the following clamp, by this time has been brought into position by the rotation of the head to grasp the string at a point on the other side of the bag from the leading clamp. The string is then cut off by being pressed against a rotating cutting wheel 36 by a rod 37 (Fig. 7) leaving a second end or short string 38 connected to the bag and held by the following clamp. The following clamp then is moved closer to the leading clamp in the dotted line position 39 of Fig. 7, and as shown in Fig. 3, allowing the bag to drop, supported by both strings 26 and 38.

Further movement of the head carries the clamps directly over a slot 40 in a plate 42, which is placed above the level of the bag (Fig. 7). The strings therefore pass into the slot (Fig. 4) while the bag is disposed below the plate. A rotating knife 43 is placed above the plate and close to it for cutting off the strings, and a spring stop 44 is located above the edge of the knife to insure cutting close to the bag. While the leading clamp 28 moves to the right as seen in Fig. 4 the spring stop holds the string away from the knife until the bag has been pulled up against the plate and tension has been applied to the string to bend the spring to the dotted line position of Fig. 7. When the spring has reached this position the string touches the rotating knife and is severed. This severing occurs quite close to the bag if desired. The knife can be adjusted to lie virtually on the plate, so that the length of the end of string remaining on the bag can be as little as the thickness of the plate, which is negligible. In fact the string may be cut off inside the bag, as will be explained.

After the string 26 has been cut, the bag may drop, taking up the slack in string 38 which is shown in Fig. 4. Thereafter further movement of the head 30 carries the following clamp 34 to the right to tighten string 38 across the spring stop and sever string 38 as previously described for string 26. In this way each string is severed close to the bag and independently of the other string. Fig. 6 shows both strings severed and the bag dropping down a delivery chute 46.

The mechanism

Referring particularly to Figs. 7 to 11 the rotating head 30 is keyed to a hollow shaft 50 (Fig. 8) rotated by any suitable gear 52 driven at a uniform speed by any suitable prime mover 54. The hollow shaft may be supported in a bearing 56. The head 30 carries a pair of diametrically opposite leading clamps 28. As shown in Fig. 7 each leading clamp has a jaw 60 rigidly secured to the head 30 and a radially movable jaw 62 sliding in guideways 64. The sliding jaw 62 is biased toward jaw 60 to close the clamp by a compression spring 66 (Figs. 8, 10) confined between an abutment 68 fixed to the head 30 and an abutment 70 fixed to the sliding jaw. The jaw 62 is moved away from jaw 60 to open the clamp by a cam follower 72 secured to the jaw 62 and moved by a stationary radial cam 74 attached to a cam plate 76 secured to a stationary support 78 inside the tubular shaft 50.

The head 30 is rotated continuously. A cam 74 is placed wherever it is desired to hold the clamp open. For example, one cam may be located adjacent the radial line 80 and another adjacent the radial line 82. With this construction, the clamp as it travels in a counter-clockwise direction will open for a short interval as it arrives adjacent the cam 74 at the radial line 80 to permit a string end previously severed from an object to be discharged. Likewise the clamp as it arrives opposite the cam 74 at the radial line 82 will open for a short interval in the same manner and then as it rides off the cam will close to grasp the string 26 while the latter is held in a vertical position, for example, by the bag tying mechanism 24 (Fig. 1) and will hold the string until after it has been cut off by the knife 43, as shown in Figs. 5 and 6.

The head 30 also carries a diametrically opposite pair of following clamps 34, only one of these being shown, for clarity, in Figs. 7, 8, and 11. Each following clamp is mounted on the upper end of a rotatable shaft 90 journaled in the head 30 (Figs. 7, 8). A gear 92 is keyed to the lower end of the shaft 90 and meshes with an idler gear 94 meshing with a driving gear 96 keyed to a shaft 98 journaled in the head 30. The gear 96 can be rotated at desired times to swing the clamp on the shaft 90, as will be explained. When not being swung on the shaft 90, the clamp is held in fixed position with respect to the head 30 by the gears referred to.

The following clamp grasps the string 38 while the string is held horizontal between the leading clamp and the friction brake 32. For this purpose the following clamp includes a fixed jaw 100 (Fig. 8) rigidly secured to the shaft 90, on which is mounted a movable jaw 102 on a horizontal pivot 104. The movable jaw is biased toward the fixed jaw, to close the clamp, by a compression spring 106 and is moved away from the fixed jaw to open the clamp by a cam follower 108 moved vertically by a stationary cam 110 on the rim of the cam plate 76. The cam 110 is proportioned and placed to hold the following clamp open as it approaches the full line position shown in Fig. 7, immediately thereafter letting the clamp close to grasp the string 38, the clamp remaining closed until after the string has been cut off by the knife 43. Thereafter the clamp may be opened to drop the end of the string which has been cut off.

After the string 38 has been grasped by the following clamp 34 in the full line position of Fig. 7, the clamp is quickly swung to the dotted line position 39 without any substantial change in the position of the leading clamp 28. In this movement the positions of the two clamps change from that shown in Fig. 2 to that shown in Fig. 3. Thereafter, during rotation of the head the two clamps maintain their relative positions as seen in Figs. 4, 5, 6. This acceleration of the following clamp, or its movement closer to the leading clamp is accomplished by rotating the shaft 90 to swing the following clamp forward. This swinging is accomplished by the following mechanism.

A cam 120 is fixed to the cam plate 76. A cam follower 122 is mounted on an arm 123 keyed to the upper end of the shaft 98. As the head 30 is rotated, whenever the cam follower 122 reaches a bulge in the cam 120 the arm 123 is rotated counterclockwise with the shaft 98, as seen in Fig. 7, through the gears 92, 94 and 96. This swings the clamp 34 forward. Preferably also the following clamp can be swung backward, from the full line position shown in Fig. 7 by a reverse movement of the arm 123 when the cam follower strikes a depression in the cam 120. The cam follower can be urged against the cam in any known manner, as by a spring or by making the cam 120 of the box or positive motion type. The cam face 110 is sufficiently wide in the radial direction to bear against the cam follower 108 when the clamp is swung from the full line position to the dotted line position of Fig. 7 and thus the clamp remains closed to hold the string securely during this movement.

It is contemplated that the device may be used to cut strings from bags tied on the inside so that the cut ends lie entirely within the bag when the operation is completed.

In Fig. 12 a bag 130 is formed by folding a flat sheet of material, such as cotton gauze, into a neck 132, inverting the neck to place the edges of the sheet inside the bag, and placing a tie 134 around the neck inside the bag thus formed. The bag thus encloses the tie, which may be formed by the string 22. A slit 136 entering the bag is formed between folded edges of the sheet as the bag is being formed. The ends of the string forming the tie, which may be the strings 26 and 38, pass out through this slit. The bag is thus filled with crumpled gauze and is in effect an elastic ball tied with a string inside the ball, and having the ends of the string coming out through the slit 136.

When one of the strings, for example, is held by a clamp and drawn across the spring 44 as shown in Fig. 11, the ball is pulled up against the plate 42 while the spring holds the string away from the knife 43. Thereafter movement of the head 30 pulls on the string, both deflecting the spring 44 and deforming the ball. Tension in the string tends to flatten that portion of the ball between the tie 134 and the plate 42. The stiffness of the spring 44 is so selected that before the spring bends far enough to let the string be cut, the tie 134 has approached the plate 42 closely, due to compression of the ball. Therefore the string is cut very close to the tie and after the strings have been cut, the ball, in expanding to its original form shown in Fig. 12, draws the cut ends of the string inside the ball through the slit 136. This provides a smooth gauze ball, positively tied with a string which is disposed entirely within the ball.

As shown in Figs. 7 and 11 the knife 43 is covered by a plate or housing 140 having a slit 142 through which the string can be drawn to reach the knife. The knife may be constantly rotated by any suitable motor 144.

The invention claimed is:

1. In apparatus for severing an excess string end from an object to which the string is fastened, the combination which includes means for seizing the string end at a point spaced from the point where the string is fastened to the object, a string cutter presenting a cutting edge, a pair of spaced shoulders presenting a slot located beneath and adjacent the string cutter and which extends inwardly toward and beyond said edge, said shoulders permitting entry of the string end within the slot but denying passage through the slot of the object to which the string is fastened, and means for conveying the string seizing means in a path extending above the slot and cutter first to move the string end into the slot and the object into engagement with the shoulders, and subsequently to move the string end into engagement with the cutter.

2. The combination according to claim 1 wherein, in association with the cutter, there is provided a yielding stop for holding the string out of engagement with the cutter until the object has been moved into engagement with the shoulders.

3. In apparatus for severing a plurality of string ends from an object to which the string is fastened, the combination which includes a plurality of devices for seizing each a string end at a point along the string end spaced from the point where the string end is fastened to the object, a string cutter presenting a cutting edge, a pair of spaced shoulders presenting a slot adjacent the string cutter and which extends inwardly toward and beyond said edge, said shoulders permitting entry of the string ends within the slot but denying passage through the slot of the object to which the string ends are fastened, and means for conveying the string end seizing devices each in a path extending over the slot and cutter first to move the string ends into the slot and the object into engagement with the shoulders, and subsequently to move both string ends into engagement with the cutter.

4. The combination according to claim 3 in which the string end seizing devices are moved toward each other to produce slack in the string ends as the string seizing devices are moved by the conveyor toward the string cutter.

5. The combination according to claim 3 wherein each string end seizing device is located on the conveyor means therefor in manner such that the string ends held by the respective seizing devices are moved independently against the cutter.

6. The combination according to claim 5 wherein there is provided, in association with the cutter, a device yieldable under the action of the individual string ends as the object is moved toward the shoulders to insure application of a predetermined tension in the string ends prior to their engagement by the cutter.

References Cited in the file of this patent

UNITED STATES PATENTS

| 1,732,678 | Garisio | Oct. 22, 1929 |
| 1,975,487 | Topping | Oct. 2, 1934 |
| 2,259,697 | Jehle et al. | Oct. 21, 1941 |
| 2,372,788 | Lombardo | Apr. 3, 1945 |
| 2,424,555 | Curtis | July 29, 1947 |
| 2,512,414 | Booth | June 20, 1950 |